US008456666B2

(12) United States Patent (10) Patent No.: US 8,456,666 B2
Salgado et al. (45) Date of Patent: Jun. 4, 2013

(54) PRINTER DRIVER INTERFACE AND METHODS

(75) Inventors: David Salgado, Victor, NY (US); Jeremy Griffith, East Rochester, NY (US); Gregory Fruin, Webster, NY (US); Alan K. Robertson, Rochester, NY (US); Richard Schwartz, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 1006 days.

(21) Appl. No.: 11/778,901

(22) Filed: Jul. 17, 2007

(65) Prior Publication Data

US 2009/0021772 A1 Jan. 22, 2009

(51) Int. Cl.
*G06F 3/12* (2006.01)
(52) U.S. Cl.
USPC ......... 358/1.15; 358/1.13; 358/1.18; 715/274
(58) Field of Classification Search
USPC ................................. 358/1.1–1.16
See application file for complete search history.

(56) References Cited

U.S. PATENT DOCUMENTS

| | | | | |
|---|---|---|---|---|
| 5,608,496 | A * | 3/1997 | Hanzawa et al. | 399/81 |
| 5,745,659 | A * | 4/1998 | Rigau Rigau et al. | 358/1.2 |
| 5,872,569 | A | 2/1999 | Salgado | |
| 5,987,535 | A | 11/1999 | Knodt et al. | |
| 6,470,155 | B1 | 10/2002 | Martin et al. | |
| 6,741,270 | B1 * | 5/2004 | Rzepkowski et al. | 715/810 |
| 6,748,183 | B2 | 6/2004 | Edmonds | |
| 6,825,941 | B1 * | 11/2004 | Nguyen et al. | 358/1.15 |
| 2005/0047659 | A1 * | 3/2005 | Tanaka | 382/170 |
| 2007/0188791 | A1 * | 8/2007 | Utsunomiya et al. | 358/1.13 |
| 2007/0296981 | A1 * | 12/2007 | Lee et al. | 358/1.1 |

OTHER PUBLICATIONS

Canon, imageCLASS 2300 Copying Guide, 2003, Canon U.S.A. Inc., Chapter 2.*
HP, HP LaserJet 1020 Software Technical Reference, Apr. 2005, Hewlett-Packard Development Company, Edition 1, Chapter 3.*
HP, HP LaserJet 4250/4350 series Software Technical Reference, Oct. 2004, Hewlett-Packard Development Company, Edition 1.*
Screenshots from HP LaserJet 4250 Printer Driver as disclosed in HP LaserJet 4250/4350 series Software Technical Reference, 2004.*

* cited by examiner

*Primary Examiner* — Benny Q Tieu
*Assistant Examiner* — Michael Y Tzeng
(74) *Attorney, Agent, or Firm* — Ronald E. Prass, Jr.; Prass LLP

(57) ABSTRACT

Disclosed are methods of controlling printing of a document using a printer driver interface, and corresponding apparatus and computer-readable medium. The embodiments receive a print command to print a document having a document size, display the printer driver interface, the printer driver interface including the document size, display a selectable paper output size on the printer driver interface, the selectable paper output size allowing a user to select a user-selected one of a plurality of different paper output sizes, display user-selectable scaling options on the print driver interface, the scaling options for applying scaling to an image to be printed on the user-selected one of the plurality of different paper output sizes, receive from the user the user-selected one of the paper output sizes, and control printing of the document using the user-selected one of the paper output sizes.

12 Claims, 7 Drawing Sheets

PRINTER DRIVER INTERFACE AND METHODS

CROSS REFERENCE TO RELATED APPLICATIONS

This application is related to the following US applications, filed simultaneously with this application, and the disclosures of which are incorporated by reference herein in their entirety: 1) Ser. No. 11/778,829; 2) Ser. No. 11/778,851; 3) Ser. No. 11/778,868 ; and 4) Ser. No. 11/778,883.

BACKGROUND

Disclosed herein are methods for controlling printing using a printer driver interface, as well as corresponding apparatus and computer-readable medium.

Image forming devices such as printers, copiers and multi-function devices provide users the ability to print from a device such as a desktop or laptop computer, a handheld computer, or other electronic devices, to a printer connected to the device. The electronic devices may be stand alone devices, or may be connected in a network, such as in a business computing environment, which may include one or more printers.

In order for a printer to interface with and function with the computer to which it is connected, a printer driver can typically be installed on the computer. A printer driver is software which controls the printer from the computer. The printer driver may include a user interface which may be typically accessed by a user through an operating system or an application program, such as a word processing program, a spreadsheet program, or other types of programs, and viewed on a display.

When a user is getting ready to print a document, the document will usually have a page size, such as letter size, legal size, A4, envelope, and the like, that is typically set in the application that the document was created in. The user may decide to print the document with a different paper size. A user may also wish to make other changes to the document to be printed, such as scaling of the printed image, changing orientation of the printed image, and changing a position of the image on the page. It would be useful if the printer driver would help the user make these decisions and allow the user to see how the resulting printed document would appear. Current printer driver interfaces do not provide this functionality.

SUMMARY

According to aspects of the embodiments, there is provided methods of controlling printing of a document using a printer driver interface, and corresponding apparatus and computer-readable medium. The methods include receiving a print command to print a document having a document size, displaying the printer driver interface, the printer driver interface including the document size, displaying a selectable paper output size on the printer driver interface, the selectable paper output size allowing a user to select a user-selected one of a plurality of different paper output sizes, displaying user-selectable scaling options on the print driver interface, the scaling options for applying scaling to an image to be printed on the user-selected one of the plurality of different paper output sizes, receiving from the user the user-selected one of the paper output sizes, and controlling printing of the document using the user-selected one of the paper output sizes.

DETAILED DESCRIPTION

Figure 1:
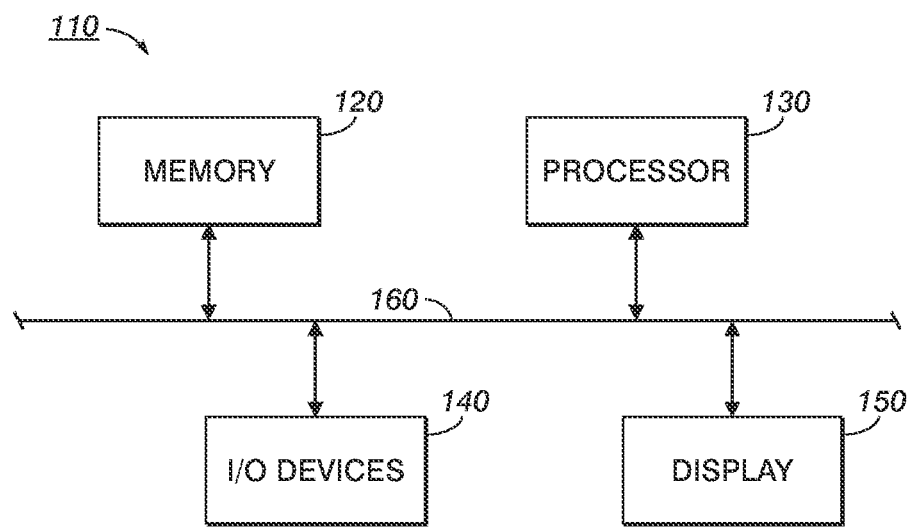
FIG. 1 illustrates a block diagram of a system for controlling a printer.

Aspects of the embodiments disclosed herein relate to methods for controlling printing of a document using a printer driver interface, and corresponding apparatus and computer-readable medium. The embodiments present a printer driver interface to a user that presents an original document size, a selectable paper output size, and scaling options for scaling an image to be printed. These features allow a user to easily select a paper output size different from the original document size, and to select scaling options to be applied to the printed image.

Embodiments may also include display on the printer driver interface of a scaling percentage selectable by the user. The scaling percentage may allow the user to input any desired percentage for scaling of the image. Embodiments may also include display on the printer driver interface of orientation and positioning options allowing a user to select desired orientation and positioning to be applied to the printed image.

Also, embodiments may include display on the printer driver interface of a page mimic, that displays a representation of the page to be printed and an image representation of an image on the page representation. The page mimic may display the image representation having a size corresponding to the user-selected scaling percentage, be displayed on the page representation in the position selected by the user, and/or be displayed with a portrait or landscape format as selected by the user. These features allow a user to select paper capabilities such as paper size, scaling, orientation, image position and so forth in an easy to use and intuitive manner, and to see the results in the page mimic before printing the page. When the user changes the paper capabilities, the page mimic is automatically updated to reflect the changes.

The embodiments include methods for controlling printing of a document using a printer driver interface, and corresponding apparatus and computer readable medium. The methods and corresponding apparatus and computer readable medium include receiving a print command to print the document having a document size, displaying the printer driver interface, the printer driver interface including the document size, displaying a selectable paper output size on the printer driver interface, the selectable paper output size allowing a user to select a user-selected one of a plurality of different paper output sizes, displaying user-selectable scaling options on the print driver interface, the scaling options for applying scaling to an image to be printed on the user-selected one of the plurality of different paper output sizes, receiving from the user the user-selected one of the paper output sizes, and controlling printing of the document using the user-selected one of the paper output sizes.

The term "application" in the disclosed embodiments refers to a program designed for end users of a computing device, such as a word processing program, a database program, a browser program, a spreadsheet program, a gaming program, and the like. An application is distinct from systems programs, which consist of low-level programs that interact with the computing device at a very basic level, such as an operating system program, a compiler program, a debugger program, programs for managing computer resources, and the like.

A printer "document setting" in the disclosed embodiments refers to a setting of an attribute of a document to be printed that can be selected and saved by the user. Examples of printer document settings are settings for stapled or not stapled, paper size, watermark, paper tray, print resolution, and color printing or black and white printing. A printer "default setting" in the disclosed embodiments refers to one or more document settings that are saved as a default setting to be automatically used for printing unless manually changed at the time of printing. A printer "document default setting" in the disclosed embodiments refers to one or more document settings that are saved to be automatically used for printing the particular document unless the settings are manually changed at the time of printing.

FIG. 1 illustrates a diagram of a system 110. The system 110 may be embodied within devices such as a desktop computer, a laptop computer, a handheld computer, a handheld communication device, or another type of computing device, or the like. The system 110 may include a memory 120, a processor 130, input/output devices 140, a display 150 and a bus 160. The bus 160 may permit communication and transfer of signals among the components of the computing device 110.

Processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of static storage device that stores static information and instructions for processor 130. The memory 120 may be any memory device that stores data for use by system 110.

Input/output devices 140 (I/O devices) may include one or more conventional input mechanisms that permit a user to input information to the system 110, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above. The display 150 may typically be an LCD or CRT display as used on many conventional computing devices, or any other type of display device.

The system 110 may perform functions in response to processor 130 by executing sequences of instructions or instruction sets contained in a computer-readable medium, such as, for example, memory 120. Such instructions may be read into memory 120 from another computer-readable medium, such as a storage device, or from a separate device via a communication interface, or may be downloaded from an external source such as the Internet. The system 100 may be a stand-alone system, such as a personal computer, or may be connected to a network such as an intranet, the Internet, or the like.

The memory 120 may store instructions that may be executed by the processor to perform various functions. For example, the memory may store printer driver instructions to allow the system to perform various printing functions in association with a particular printer connected to the system. The printer driver instructions are typically unique to each specific type of printer, and the system 110 may store a plurality of print drivers each for a different printer.

Figure 2:
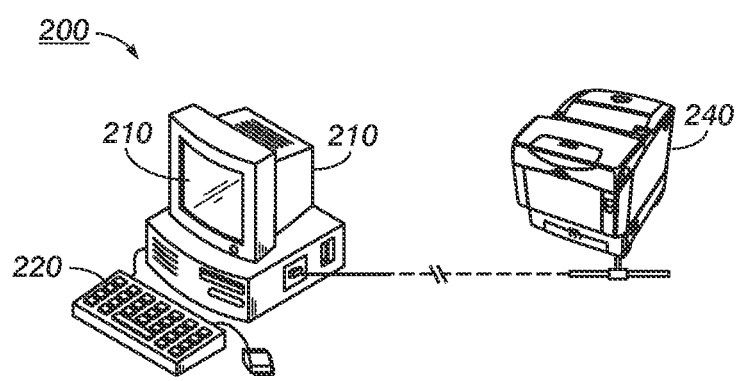
FIG. 2 illustrates a block diagram of a system for controlling a printer.

FIG. 2 illustrates a system 200. The system 200 includes a computer 210, which includes the elements of system 110, including the memory 120, the processor 130, I/O devices 140 and a display 150. The computer 210 could be a standard personal computer, or could be another type of computing device such as a handheld computer, a phone, a laptop computer, or the like.

The system 200 may also include a keyboard 220 functioning as an input device. The keyboard may be replaced or supplemented by the input devices as illustrated in FIG. 1.

The system 200 may also include a display 230 functioning as an output device for displaying images generated or received by the computer 210, corresponding to display 150 shown in FIG. 1. The display 230 may display images to be viewed by a user, such as various application programs, a user interface (UI), text, photographic images, or the like. For example, the display may generate a user interface in response to a print driver stored in memory 120, such as a user interface for the print driver. The print driver could also be stored in a memory in a network that the computer 210 is connected to, such as in a network server.

The system 200 may have a printer 240 connected thereto for printing data such as images, text, or the like in response to a user directing the computer 210 to print, for example. In response to such a print command, the processor will typically cause the print driver to communicate with the printer to perform the needed printing.

The system 200 may be connected to a network, such as such as an intranet, the Internet, a wireless network, or the like. In addition, the system 200 may be connected to a plurality of printers such as printer 240. The plurality of printers may be of a same printer type or of varying printer types.

Figure 3:
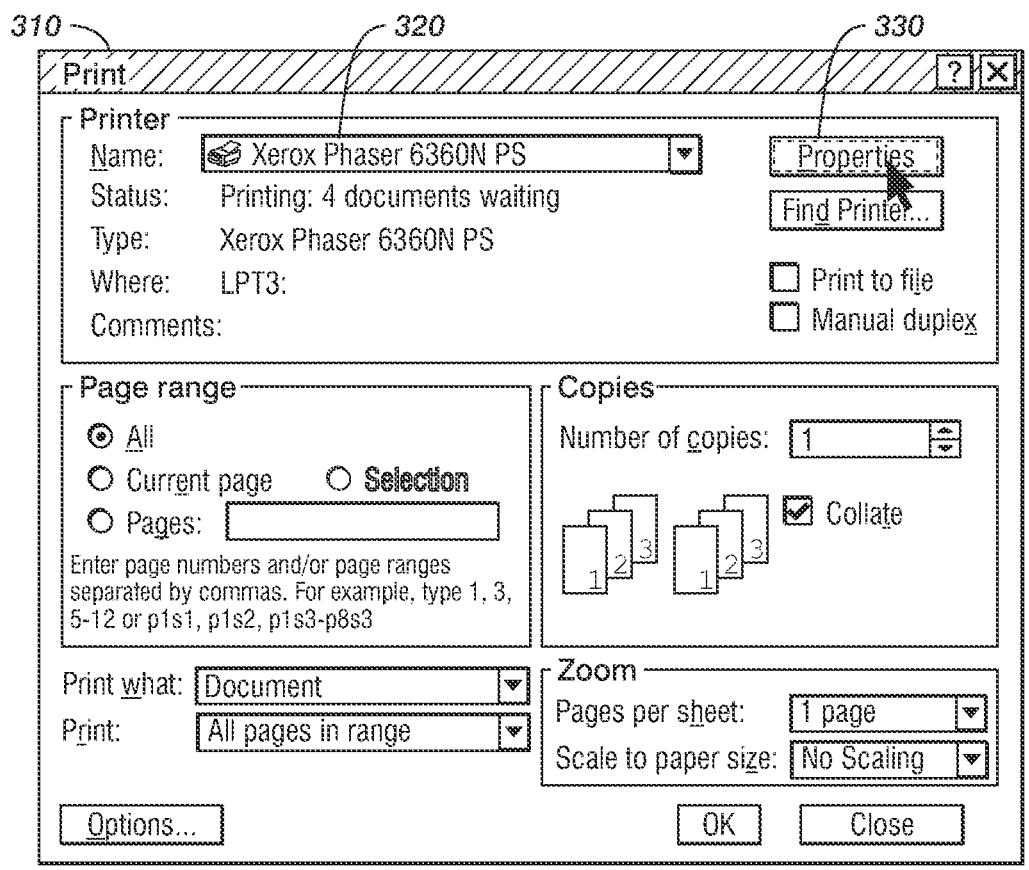
FIG. 3 illustrates a diagram of a printer driver user interface.

FIG. 3 illustrates a printer user interface 310 that may be displayed on a display of computer 210. The printer user interface 310 may be invoked and displayed when a user selects a print function on the computer 210, typically using an input device such as keyboard 220, for example. The user may typically select a printer in the printer selection area 320. The user will typically be able to select from all printers for which a print driver has been loaded into memory of the computer 210. In the case of the FIG. 3 example, the user can select from printers through the use of a drop-down menu, and printers other than the one shown may be selected. Upon selection of properties 330, a further printer user interface 410 will be displayed. The user may also be able to cause display of the printer user interface 410 in other ways, such as selecting the corresponding printer such as through the control panel, and then selecting printing preferences, although any way of reaching this interface could be used. The print user interfaces 310, 410 are example interfaces, and other print user interfaces may be used.

Figure 4:
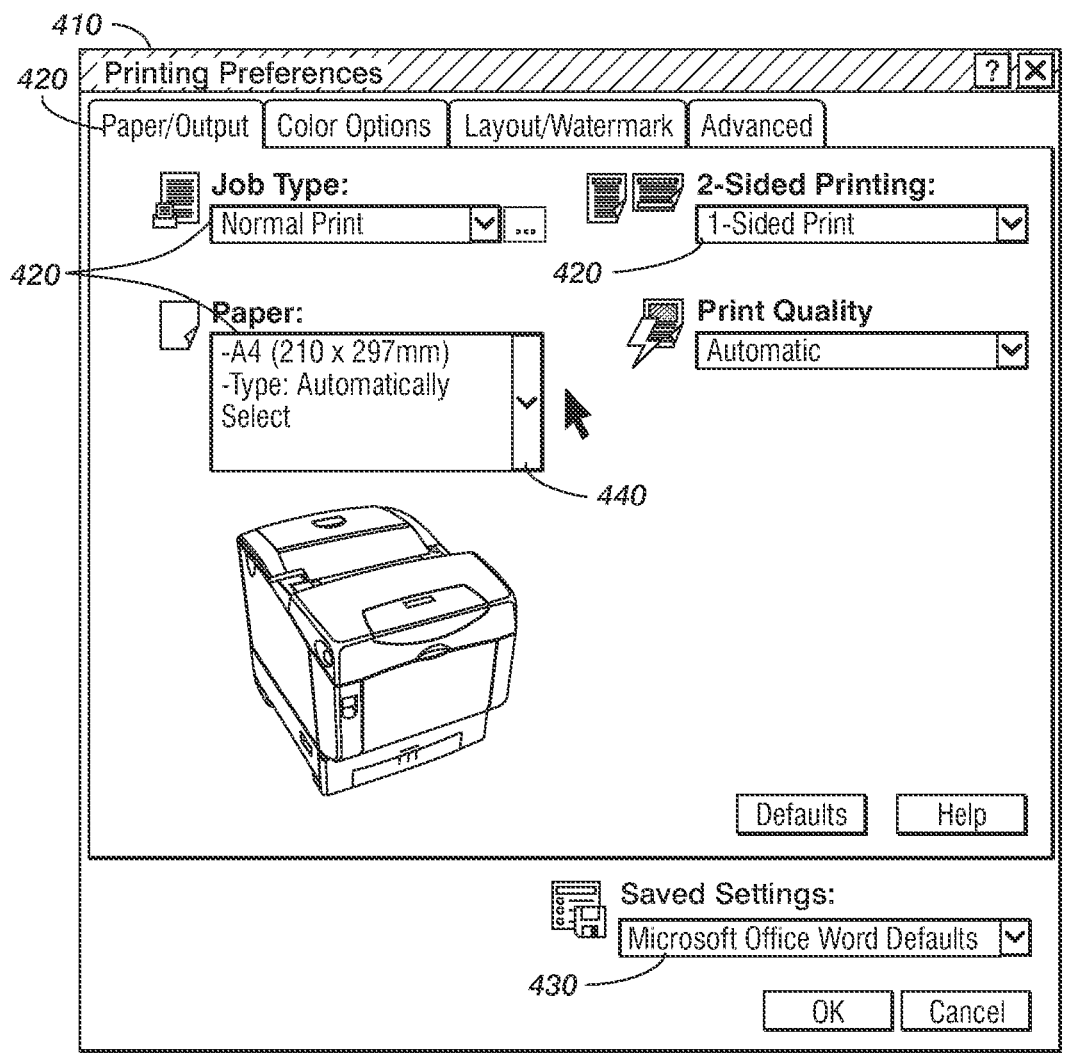
FIG. 4 illustrates a diagram of a printer driver user interface.

FIG. 4 illustrates an exemplary diagram of a further printer user interface 410 that may be displayed on a display of computer 210, for example. The printer user interface 410 includes one or more printer document settings 420 that may be selected and set by the user. The document settings 420 are settings of an attribute of a document to be printed. The user may select and save different printer document settings 420 prior to printing. For example, the printer document settings may include paper, output, special pages, layout, watermark, image options, advanced, and so forth. The paper setting may allow selection of a paper size, a paper color, or other paper features. The output setting may include a selection of 1 or 2 sided printing, a print quality, a destination, or the like.

A layout setting may allow selection of page layout features such as portrait, landscape, number of sheets per page, or the like. A watermark setting may allow selection of watermark features such as draft, confidential, print in background, or the like. An image options setting may allow selection of features such as application reduce/enlarge, PostScript pass-through, mirrored output, or the like. An advanced setting may allow selection of features such as booklet layout, image color management, or the like.

The printer document settings shown and described herein are only examples. Any printer document settings may be used including those that are selectable by the user.

The printer user interface 410 also shows printer default setting 430 that may be saved by a user. After selecting document settings 420, the user may save the printer document settings 420 for use as a printer default setting. This may be accomplished with the printer default settings 430. In the example shown in FIG. 4, this may be done with the use of a drop-down menu, that allows saving of the selected document settings 420 as a printer default setting (driver default), as an application default setting, under a user selected name, or as a document default setting.

When the selected printer settings are saved as driver defaults, the printer settings may be used when the user selects the corresponding print driver via selection of the printer. Different types of printers have different print drivers, and selection of a particular printer for printing will open the corresponding print driver. If the document settings 420 have previously been saved as driver defaults, they may be used for printing with the corresponding printer unless the user manually changes the saved printer settings.

The user may also save the document settings 420 as a default document setting. When the document settings are saved as a default document setting, anytime the user prints from the default document with the corresponding printer, the document default setting will be used unless the user manually changes the document settings. For example, the user may save the document settings 420 as Document Default, as shown in FIG. 4. When the user prints the particular document with the corresponding printer, the default document setting will be invoked for printing. In particular, if the user, after saving the document settings 420 as default document setting, selects print when the particular document is open, a printer user interface such as printer user interface 310 may be displayed. If the user then selects OK, the printing will commence with the Document Default setting, and the document settings that were saved will be used for printing.

The embodiments may automatically provide the user with the option of saving the documents settings as a document default setting with the Document Default as shown in FIG. 4, or may use the current name of the document in providing the document default setting. For example, if the document is named March Expenses, the drop-down menu may provide the option to save as "March Expenses Default."

Additionally, the embodiments allow the user to save document settings using a name that the user chooses. For example, the user can select any name to save document settings for later use using the dropdown menu of FIG. 4, using the Save As feature 440. The user can select a name and then invoke the saved settings for that name using the drop-down menu when printing a document.

Additionally, the embodiments allow the user to save documents settings as an application default. Then, when the user prints a document from the corresponding application, the embodiments may use the corresponding application default for printing.

Also shown in FIG. 4 is a paper selection 440. The paper selection 440 allows the user to select paper features such as other size paper for output. The paper selection 440 in this example is selection with the use of a dropdown, but other methods of selection may be used.

Figure 5:
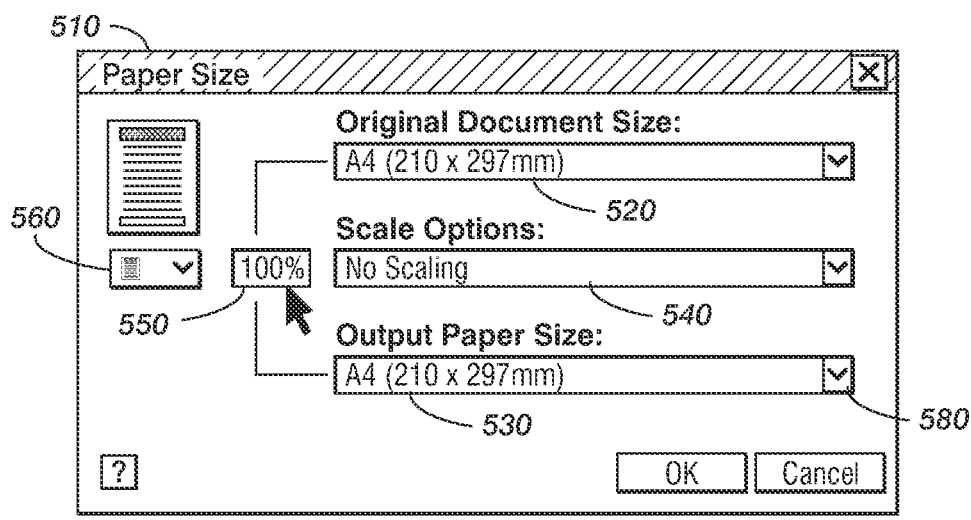
FIG. 5 illustrates a diagram of a printer driver user interface.

Through the use of paper selection 440, the user may select to choose another paper size, which may cause display of printer driver interface window 510, as shown in FIG. 5. The printer driver interface window 510 may be overlaid over the printer driver interface 410, or may be opened in the printer driver interface 410. In either instance, the printer driver interface window 510 is considered as part of the print driver interface 410.

The printer driver interface window 510 includes an original document size 520, an output paper size 530, a scaling options 540, a scaling factor 550, a paper orientation 560, and a page mimic 570. The original document size 520 may be automatically selected by the printer driver interface as the size of the document in the application from which the user is printing.

The output paper size 530 is selectable by the user with the use of a drop-down menu control 580, although any method of selecting output paper size may be used. The drop-down menu control 580 may automatically be populated with paper size choices available on the corresponding printer, or may be populated with various paper sizes. A user may have an input paper size that is different from an output paper size that the user selects. A user may indicate that the user is ready to print by selecting the ok button in FIG. 5 and/or the ok button in FIG. 4, for example, at which time the method may control printing based on the user-selected paper output size.

Figure 6:
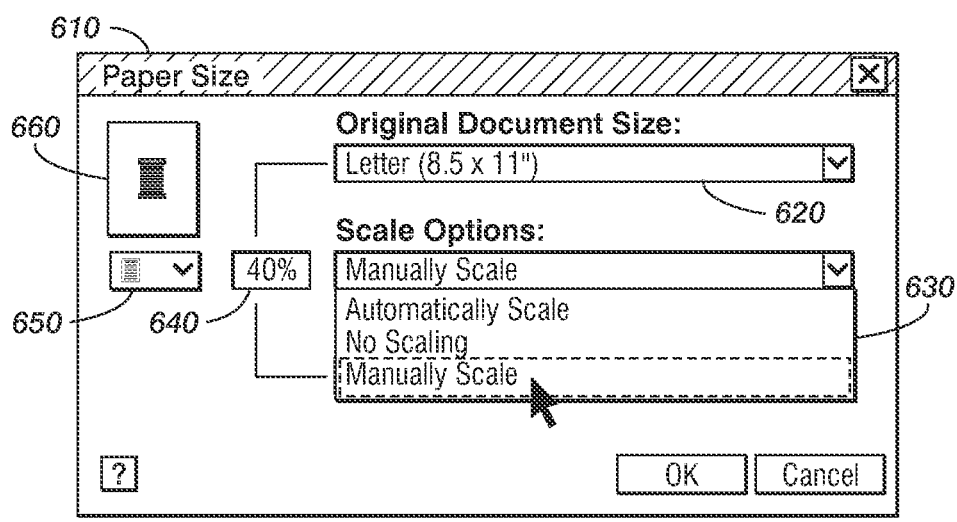
FIG. 6 illustrates a diagram of a printer driver user interface.

FIG. 6 illustrates a printer driver interface window 610, in which the scaling options 630 has been selected to manual scale with the scaling factor 640 set by the user to 40%. The scaling options 630 allows the user to select scaling options, which may include no scaling, automatically scale, or manual scale. If the user selects no scaling and the original size document 620 is larger than the output size selected, the page image will be cropped to fit. If the original document size is smaller than the output size selected, extra space will appear around the image that will be printed. When no scaling is selected, the scaling factor 640 shows 100% indicating no scaling of the image.

If the user selects automatically scale in the scaling options 630, the interface will automatically scale the image to fit the output paper size selected by the user. The automatic scaling factors are determined by a comparison of the paper sizes. If the user selects automatically scale and the original size document is larger than the output size selected, the page image will be reduced in scale to fit the output paper size. If the original document size is smaller than the output size selected, increased in scale. The scaling factor 640 will shows the % indicating the amount of scaling of the image.

If the user selects to manually scale the image, the user can insert any desired scaling factor percentage, including factors over 100%, in the scaling factor 640. This allows the user to reduce or increase the size of the image to be printed as desired. In the example of FIG. 6, the user has selected to manually scale the image to 40%, thus reducing the size of the image. Each document (input and output) will typically include borders along outer edges of the document, and the image will be printed within the area inside the borders. If he user selects a scaling factor of 40%, the size of the image on the output document will be reduce to occupy 40% of the area within the borders. If the user selects a scaling factor over 100%, the image will be cropped at the edges to still fit within the borders.

The page mimic 660 creates a sample of what the image will look like based on the selected paper output size, the scaling factor 640, and the selected page orientation 650. In the example of FIG. 6, the user has selected a 40% manual scale, so the page mimic 660 shows an image of how the output page will appear, with the image reduced to 40%.

Figure 7:
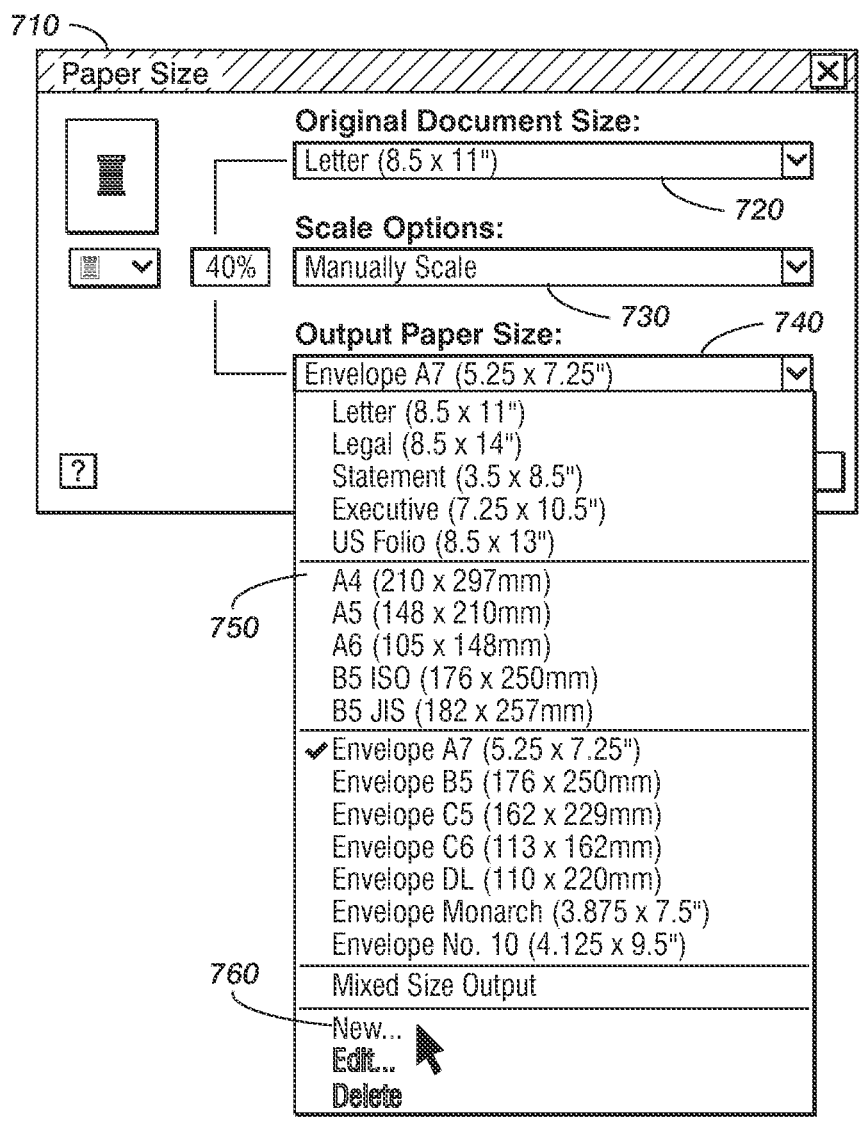
FIG. 7 illustrates a diagram of a printer driver user interface.

FIG. 7 illustrates a printer user interface window 710, that includes an original document size 720, a scaling options 730, an output paper size 740, a list of selectable output paper sizes 750, and a New paper setting 760. The list of selectable output paper sizes 750 from which a user may choose may be populated with standard paper sizes commonly in use, or may be limited to paper sizes usable with the particular printer. The user may select any of the output paper sizes. The New paper setting 760 allows the user to select a custom size output paper size.

Figure 8:
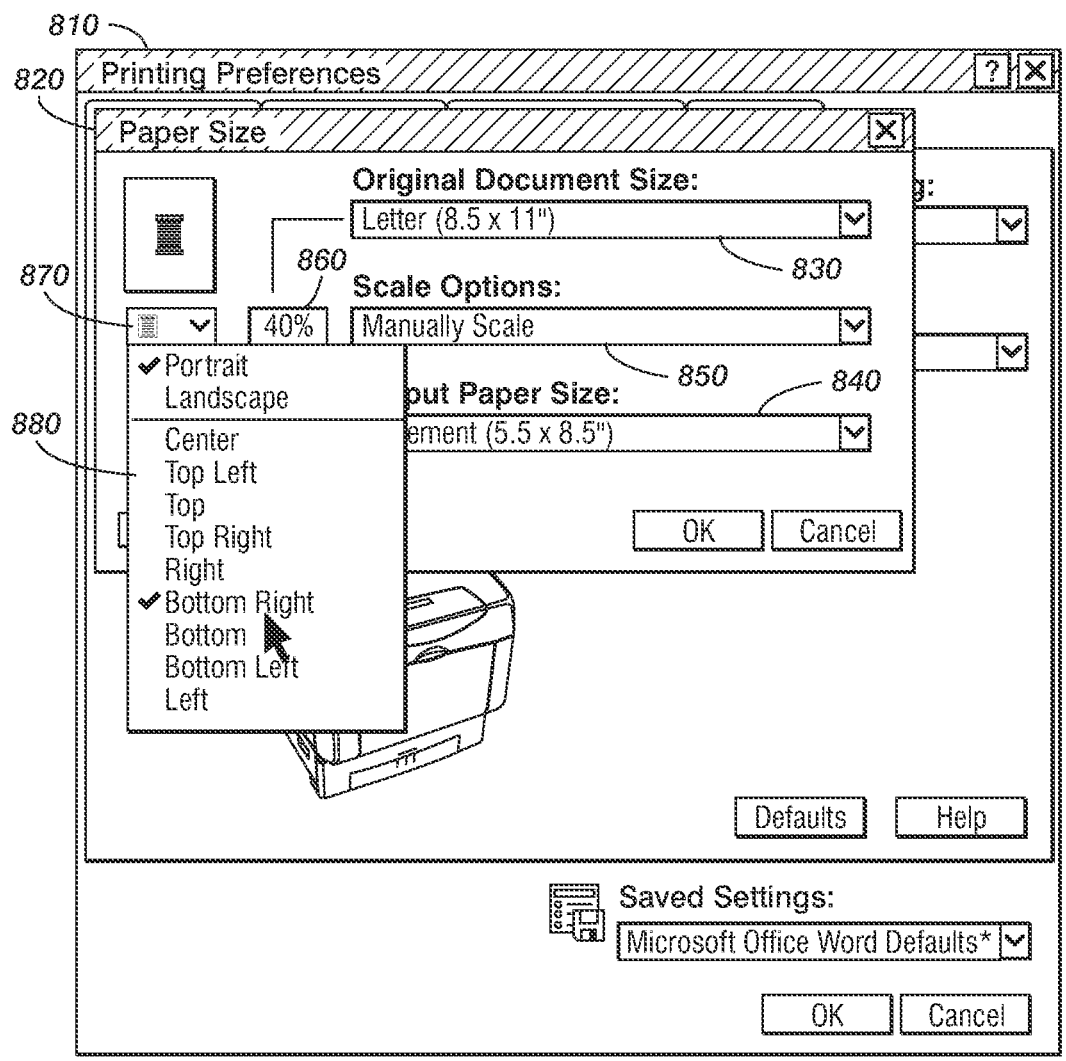
FIG. 8 illustrates a diagram of a printer driver user interface.

FIG. 8 illustrates a printer user interface 810. In this example, the printer user interface window 810 is shown as an overlay over the printer user interface 810. The printer user interface window includes an original document size 830, an output paper size 840, a scale options 850, a scaling factor 860, a paper orientation 870, and a page mimic 880. The paper orientation 870 allows the user to select between portrait or landscape, and a position of the image on the page, such as center, top left, top, top right, and so forth.

In the FIG. 8 example, the scale options 850 has been set to manual, the scaling factor 860 has been set to 40%, and the user has selected portrait and bottom right from the paper orientation 870. The page mimic 880 mimics the appearance of a potential output page based on the selected output paper size 840, scale options 850, scaling factor 860, and paper orientation 870. The page mimic takes a representation of an image to be printed and displays it on a page representation with the image representation having a size according to the scaling factor 860 and in a position according to the selected position. Also, the page representation is shown with portrait or landscape as selected by the user.

This allows the user to see how the output page will appear before printing. The user can easily select a page output size, whether to scale the image with automatic or manual scaling, a portrait or landscape appearance, and a position of the image on the page all from one printer driver interface, and see a representation of how those selections will appear on the page mimic. If the user changes any of the items affecting the page appearance, the page mimic 880 is automatically updated to allow the user to see the changed appearance. The page mimic allows the user to create and see a desired page appearance without having to print pages to see the appearance, and to make and see changes to the appearance.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 9:
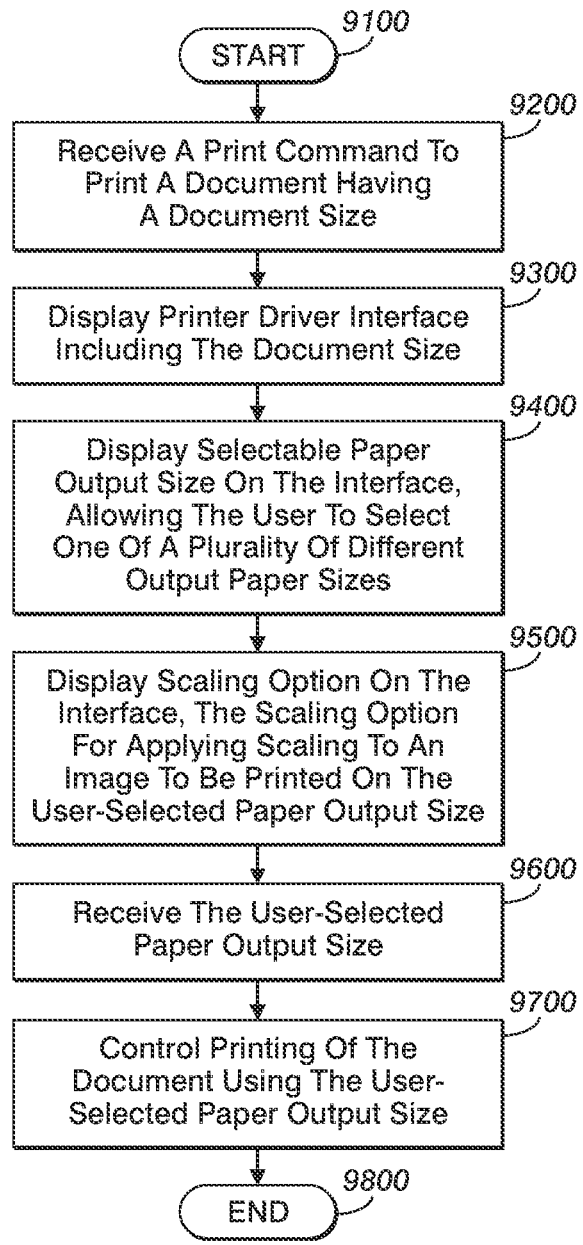
FIG. 9 illustrates a flowchart of a method for displaying paper capabilities in a printer driver interface.

FIG. 9 illustrates a flowchart of a method of displaying paper capabilities in a printer driver interface. The method starts at 9100. At 9200, a print command is received from a user to print a document, which is typically open or saved in an application. The document typically has an image disposed thereon, which could be text or some other image. At 9300, the printer driver interface is displayed including the document size. At 9400, a selectable paper output size is displayed on the printer driver interface, the selectable output paper size allowing a user to select from among a plurality of different paper output sizes. At 9500, a scaling option is displayed on the printer user interface, the scaling option for applying scaling to an image to be printed on the user-selected paper output size.

At 9600, the user-selected paper output size is received from the user. At 9700, the method controls printing of the document using the user-selected paper output size. At 9800, the method ends.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of controlling printing of a document on a printer using a printer driver interface being displayed on a computing device, comprising:

receiving a print command to print the document having a document size, the document size being a size of the document set by an application in which the document was created and from which a user is printing;

displaying the printer driver interface, the printer driver interface including the document size automatically selected by the print driver interface, and not being selectable by the user via the printer driver interface;

displaying a selectable paper output size on the printer driver interface, the selectable paper output size allowing the user to select a user-selected one of a plurality of different paper output sizes separate and apart from the document size;

displaying user-selectable scaling options on the print driver interface, the user-selectable scaling options applying scaling to an image to be printed on the user-selected one of the plurality of different paper output sizes, the user-selectable scaling options including automatic scaling;

displaying on the printer driver interface a scaling percentage based on a comparison of the document size and the user-selected paper output size when any of the user-selectable scaling options, including the automatic scaling option, is selected;

receiving from the user the user-selected one of the paper output sizes;

controlling printing of the document using the user-selected one of the paper output sizes; and displaying a drop-down menu that allows selections that include at least saving the selected document settings a default setting using a name of the document, the document size, the selectable paper output size, and the user-selectable scaling options being simultaneously displayed to the user in a single display on the print driver interface.

2. The method according to claim 1, further comprising displaying page orientation options on the printer driver interface, the page orientation options presenting the user with options to select between portrait or landscape, and to select a position of the image to be printed on the user-selected paper output size.

3. The method of claim 2, further comprising displaying a page mimic on the printer driver interface, the page mimic displaying a page representation of a page to be printed, the page mimic displaying an image representation of the image on the page representation, the image representation being displayed on the page representation in a page mimic position corresponding to a position selected by the user.

4. The method of claim 3, further comprising displaying the page mimic with a portrait or landscape format as selected by the user from the portrait and landscape options.

5. The method of claim 1, further comprising displaying a page mimic on the printer driver interface, the page mimic displaying a page representation of a page to be printed, the page mimic displaying an image representation of the image on the page representation, the image representation having a size corresponding to the scaling percentage.

6. An apparatus that controls printing of a document on a printer using a printer driver interface being displayed on a computing device, comprising:

a memory that stores print driver instructions; and a processor that is programmed to execute the print driver instructions to cause display of the printer driver interface upon receipt from a user of a print command to print the document having a document size, the document size being a size of the document set by an application in which the document was created and from which a user is printing, the processor executing the print driver instructions by displaying the printer driver interface upon receipt of the print command, the printer driver interface including the document size, the document size automatically selected by the print driver interface, and not being selectable by the user via the printer driver interface;

displaying a selectable paper output size on the printer driver interface, the selectable paper output size allowing a user to select a user-selected one of a plurality of different paper output sizes separate and apart from the document size;

displaying user-selectable scaling options on the print driver interface, the user-selectable scaling options applying scaling to an image to be printed on the user-selected one of the plurality of different paper output sizes, the user-selectable scaling options including automatic scaling;

displaying on the printer driver interface a scaling percentage based on a comparison of the document size and the user-selected paper output size when any of the user-selectable scaling options, including the automatic scaling option, is selected;

receiving from the user the user-selected one of the paper output sizes;

controlling printing of the document using the user-selected one of the paper output sizes; and displaying a drop-down menu that allows selections that include at least saving the selected document settings a default setting using a name of the document, the document size, the selectable paper output size, and the user-selectable scaling options being simultaneously displayed to the user in a single display on the print driver interface.

7. The apparatus of claim 6, the processor being further programmed to control printing of the document using the printer driver interface by displaying page orientation options on the printer driver interface, the page orientation options presenting the user with options to select between portrait or landscape, and to select a position of the image to be printed on the user-selected paper output size.

8. The apparatus of claim 7, the processor being further programmed to control printing of the document using the printer driver interface by displaying a page mimic on the printer driver interface, the page mimic displaying a page representation of a page to be printed, the page mimic displaying an image representation of the image on the page representation, the image representation being displayed on the page representation in a page mimic position corresponding to a position selected by the user.

9. The apparatus of claim 8, the processor being further programmed to control printing of the document using the printer driver interface by displaying the page mimic with a portrait or landscape format as selected by the user from the portrait and landscape options.

10. The apparatus of claim 6, the processor being further programmed to control printing of the document using a printer driver interface by displaying a page mimic on the printer driver interface, the page mimic displaying a page representation of a page to be printed, the page mimic displaying an image representation of the image on the page representation, the image representation having a size corresponding to the user-selected scaling percentage.

11. A non-transitory computer-readable medium on which is recorded a program, which when executed by a computer, causes the computer to control printing of a document on a printer using a printer driver interface being displayed on a computing device by:

displaying the printer driver interface upon receipt of the print command, the printer driver interface including the document size, the document size being a size of the document set by an application in which the document was created and from which the user is printing;

displaying a selectable paper output size on the printer driver interface, the selectable paper output size allowing a user to select a user-selected one of a plurality of different paper output sizes separate and apart from the document size automatically selected by the print driver interface, and not being selectable by the user via the printer driver interface;

displaying user-selectable scaling options on the print driver interface, the user-selectable scaling options applying scaling to an image to be printed on the user-selected one of the plurality of different paper output sizes, the user-selectable scaling options including automatic scaling;

displaying on the printer driver interface a scaling percentage based on a comparison of the document size and the user-selected paper output size when any of the user-selectable scaling options, including the automatic scaling option, is selected;

receiving from the user the user-selected one of the paper output sizes;

controlling printing of the document using the user-selected one of the paper output sizes; and displaying a drop-down menu that allows selections that include at least saving the selected document settings a default setting using a name of the document, the document size, the selectable paper output size, and the user-selectable scaling options being simultaneously displayed to the user in a single display on the print driver interface.

12. The non-transitory computer-readable medium of claim 11, wherein the instructions further comprise instructions causing the computer to control printing of a document using a printer driver interface by:

displaying page orientation options on the printer driver interface, the page orientation options presenting the user with options to select between portrait or landscape, and to select a position of the image to be printed on the user-selected paper output size; and displaying a page mimic on the printer driver interface, the page mimic displaying a page representation of a page to be printed, the page mimic displaying an image representation of the image on the page representation, the image representation being displayed on the page representation in a page mimic position corresponding to a position selected by the user.

\* \* \* \* \*